United States Patent
Uchida

(10) Patent No.: US 6,738,247 B2
(45) Date of Patent: May 18, 2004

(54) DC-DC CONVERTER

(75) Inventor: Akihiro Uchida, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 10/331,006

(22) Filed: Dec. 27, 2002

(65) Prior Publication Data

US 2003/0123265 A1 Jul. 3, 2003

(30) Foreign Application Priority Data

Dec. 27, 2001 (JP) .................................... P2001-398310

(51) Int. Cl.⁷ .............................................. H02H 3/027
(52) U.S. Cl. ..................... 361/93.1; 361/41; 324/509
(58) Field of Search ............................. 361/93.1, 91.1, 361/93.6, 35, 38, 41, 104; 324/119, 120, 416, 522, 509, 547

(56) References Cited

U.S. PATENT DOCUMENTS 6,437,576 B2 * 8/2002 Lorito ........................ 324/509

* cited by examiner

Primary Examiner—Shawn Riley
(74) Attorney, Agent, or Firm—Brenda O. Holmes; Kilpatrick Stockton LLP

(57) ABSTRACT

A DC—DC converter is composed of an overcurrent cut-off means connected in series to a direct power source, primary windings of a plurality of transformers connected in series to the overcurrent cut-off means, a switching element connected in series to the overcurrent cut-off means and secondary windings of a plurality of transformers connected in parallel with each other. According to the DC—DC converter, a voltage induced on the secondary windings are rectified and smoothed by a first rectifying and smoothing circuit to output the smooth direct voltage to a load. When a short-circuit test is carried out for one of the primary windings, the overcurrent cut-off means cuts off an overcurrent flow.

10 Claims, 4 Drawing Sheets

| TEST ITEM | | CONTENTS OF TEST |
|---|---|---|
| (1) | SHORT OF PRIMARY WINDING |  |
| (2) | SHORT OF SECONDARY WINDING |  |
| (3) | OPEN OF PRIMARY WINDING |  |
| (4) | OPEN OF SECONDARY WINDING |  |

DC-DC CONVERTER

CROSS REFERENCE TO RELATED APPLICATION

This application claims benefit of priority under 35 U.S.C. § 119 to Japanese Patent Application No. 2001-398310, filed on Dec. 27, 2001, the entire contents of which are incorporated by reference herein.

BACKGROUND OF THE INVENTION

1. Field of the Invention

The present invention relates to a DC—DC converter with a plurality of transformers, and more particularly to a DC—DC converter composed of simple circuit structure that protects the electrical device from damages safely at the time of carrying out an abnormal test for short-circuiting or open-circuiting a transformer thereof.

2. Description of the Related Art

As shown in FIG. 1, a flyback type DC—DC converter having a plurality of transformers in order to increase a total capacity of the transformers has been conventionally known. According to the conventional DC—DC converter, primary windings T1a and T2a of transformers T1 and T2 are connected in series to a switching element Q1. One ends of secondary windings T1b and T2b of the transformers T1 and T2 are connected to anodes of diodes D1 and D2, respectively. The other ends of the secondary windings T1b and T2b are commonly connected to a negative electrode of capacitor C1. Cathodes of the diodes D1 and D2 are commonly connected to a positive electrode of the capacitor C1. Auxiliary windings T1c and T2c of the transformers T1 and T2 are connected in parallel with each other.

Further, temperature fuses TF1 and TF2 are thermally coupled to the transformers T1 and T2, and are fused at the time of reaching a specified fusing temperature. When a direct voltage is applied from a direct power source 1, a current firstly flows from the direct power source 1 through a fuse F1 and a starting resistance R1 to a capacitor C2 to increase a voltage of the capacitor C2. According to such state, a control circuit 7 is activated. A PWM signal repeating alternately a high level state and a low level state is transmitted from the control circuit 7 via the temperature fuses TF1 and TF2 to a gate of the switching element Q1.

The switching element Q1 is on-off controlled by the PWM signal outputted from the control circuit 7. Then, energy is sequentially induced from the primary windings T1a and T2a to the secondary windings T1b and T2b. The energy induced on the secondary windings T1b and T2b is rectified and smoothed by the diodes D1, D2 and the capacitor C1, and then is supplied to a load 4 as an output voltage. At the same time, a voltage generated at both ends of the capacitor C1 is detected by a voltage detection circuit 10 to generate a detection signal. The detection signal is fed back to the control circuit 7 and then the control circuit 7 controls an on period of the switching element Q1 in order to supply a certain output voltage to the load 4.

There are operational tests for DC—DC converter. One of the operational tests is an abnormal test for confirming safety of device by short-circuiting or open-circuiting a transformer thereof. As shown in FIG. 2, the abnormal test has four test items. It will be described how the temperature fuse protects the electrical device from damages in the abnormal test.

(1) Short of Primary Winding

As shown in FIG. 2(1), a switch SW1as is open in advance and is connected in parallel to the primary winding T1a of the transformer T1. When the switch SW1as is closed during an operation of the DC—DC converter, an inductance component L of the secondary winding T1b of the transformer T1 is minimized. In such condition, because energy is not induced from the primary winding T1a to the secondary winding T1b, a power supplied to the load 4 is generated only by the transformer T2. This gradually increases a temperature of the transformer T2 during the operation of the DC—DC converter. The increased temperature of the transformer T2 causes a temperature of the temperature fuse TF2 coupled thermally to the transformer T2 to reach a specified fusing temperature. At the specified fusing temperature, the temperature fuse TF2 is fused. When the temperature fuse TF2 is fused, a PWM signal transmitted from the control circuit 7 to the switching element Q1 is interrupted, stopping an operation of the switching element Q1. This cuts off current flow supplied to the transformer T2. As a result, an increase in temperature of the transformer T2 is stopped. The above-described operations can prevent the DC—DC converter from firing or smoking caused by the increased temperature of itself. Therefore, the electrical device is protected from damages. Incidentally, it should be noted that the fuse F1 dose not exert any influences on the short test for the primary winding because the temperature fuse TF2 is always fused prior to the fuse F1 in this short test for absence of excess current.

(2) Short of Secondary Winding

As shown in FIG. 2(2), a switch SW1bs is open in advance and is connected in parallel to the secondary winding T1b of the transformer T1. When the switch SW1bs is closed during an operation of the DC—DC converter, an inductance component L of the primary winding T1a of the transformer T1 is minimized. In such condition, because energy is not induced from the primary winding T1a to the secondary winding T1b, a power supplied to the load 4 is generated only by the transformer T2. Similarly to the short of the primary winding, this gradually increases a temperature of the transformer T2 during the operation of the DC—DC converter. The increased temperature of the transformer T2 causes a temperature of the temperature fuse TF2 coupled thermally to the transformer T2 to reach a specified fusing temperature. At the specified fusing temperature, the temperature fuse TF2 is fused. When the temperature fuse TF2 is fused, a PWM signal transmitted from the control circuit 7 to the switching element Q1 is interrupted, stopping an operation of the switching element Q1. This cuts off current flow supplied to the transformer T2. As a result, an increase in temperature of the transformer T2 is stopped. The above-described operations can prevent the DC—DC converter from firing or smoking caused by the increased temperature of itself. Therefore, the electrical device is protected from damages. Incidentally, it should be noted that the fuse F1 does not exert any influences upon the short test for the secondary winding because the temperature fuse TF2 is always fused prior to the fuse F1 in this short test for absence of excess current.

(3) Open of Primary Winding

As shown in FIG. 2(3), a switch SW1ao is closed in advance and is connected in series to the primary winding T1a of the transformer T1. When the switch SW1ao is opened during an operation of the DC—DC converter, a current flowing through the primary windings T1a and T2a of the transformers T1 and T2 is cut off. As a result, power supply to the load 4 is stopped.

(4) Open of Secondary Winding

As shown in FIG. 2(4), a switch SW1bo is closed in advance and is connected in series to the secondary winding T1b of the transformer T1. When the switch SW1bo is opened during an operation of the DC—DC converter, a power supplied to the load 4 is generated only by the transformer T2. This gradually increases a temperature of the transformer T2 during the operation of the DC—DC converter. The increased temperature of the transformer T2 causes a temperature of the temperature fuse TF2 coupled thermally to the transformer T2 to reach a specified fusing temperature. At the specified fusing temperature, the temperature fuse TF2 is fused. When the temperature fuse TF2 is fused, a PWM signal transmitted from the control circuit 7 to the switching element Q1 is interrupted, stopping an operation of the switching element Q1. This cuts off current flow supplied to the transformer T2. As a result, an increase in temperature of the transformer T2 is also stopped. The above-described operations can prevent the DC—DC converter from firing or smoking caused by the increased temperature of itself. Therefore, the electrical device is protected from damages. Incidentally, it should be noted that the fuse F1 does not exert any influences upon the open test for the secondary winding because the temperature fuse TF2 is always fused prior to the fuse F1 in this open test for absence of excess current.

The abnormal test items (1) through (4) are implemented with respect to the transformer T1. If the same test items are carried out upon the transformer T2, the same results can be obtained. As described above, by means of the abnormal test short-circuiting or open-circuiting a transformer of the DC—DC converter, it is possible to confirm whether the temperature fuse stops an operation of the switching element Q1 to protect electrical device from damages safely at the time of abnormal condition on the DC—DC converter or not.

In the above-described abnormal test items (1), (2) and (4), however, an operation of the switching element Q1 continues for a while by using a transformer that is not short-circuited or open-circuited. Specifically, the switching element Q1 continues to operate until an increased temperature of the transformer fuses a temperature fuse to interrupt a PWM signal. Therefore, there are questions about reliability of the electrical device including the conventional DC—DC converter in abnormal condition. Further, it is necessary to provide transformers with heat-resistance and the number of temperature fuses being equal to the number of the transformers in the electrical device. Accordingly, the production costs of this device are increased. Moreover, a large space for mounting a number of the electrical components refuses compactness of the electrical device.

Accordingly, it is desirable to provide a DC—DC converter composed of simple circuit structure, which can stop an operation of switching element in a short time for safely protecting the electrical device from damages in an abnormal test.

SUMMARY OF THE INVENTION

An object of the present invention is to provide a DC—DC converter with a plurality of transformers composed of simple circuit structure, which can stop an operation of switching element in a short time in order to protect electrical device from damages at the time of carrying out an abnormal test for confirming safety of device by short-circuiting or open-circuiting a transformer thereof.

In order to accomplish the aforementioned object, the present invention provides a DC—DC converter that converts a direct voltage inputted from a direct power source into a predetermined direct voltage by controlling an on period of switching element and outputs a converted voltage, the DC—DC converter comprising an overcurrent cut-off means connected in series to the direct power source; primary windings of two or more transformers connected in series to the overcurrent cut-off means; secondary windings of the two or more transformers connected in parallel with each other; and auxiliary windings of the two or more transformers connected in parallel with each other.

According to the present invention, when a short test is carried out for the primary windings or the secondary windings of two or more transformers, the overcurrent cut-off cuts off an overcurrent flow to stop an operation of the switching element in a short time. This can safely protect the electrical device from damages.

In order to accomplish the aforementioned object, the present invention provides a DC—DC converter that converts a direct voltage inputted from a direct power source into another direct voltage and outputs a converted voltage, the DC—DC converter comprising an overcurrent cut-off means connected in series to the direct power source and cutting off an overcurrent flow; primary windings of two or more transformers connected in series to the overcurrent cut-off means and connected in series with each other; a switching element connected in series to the primary windings of the two or more transformers; secondary windings of the two or more transformers connected in parallel with each other; a rectifying and smoothing circuit for rectifying and smoothing a voltage which is induced by the secondary windings of the two or more transformers; a first short means for short-circuiting a transformer, that is connected in parallel to a primary winding of first short transformer selected among the two or more transformers; and a second short means for short-circuiting a transformer, that is connected in parallel to a secondary winding of second short transformer selected among the two or more transformers, wherein when carried out by using the first or second short means is a short test for confirming safety of device, the overcurrent cut-off means cuts off an overcurrent flow generated by short-circuit of the first or second short transformer.

According to the present invention, when the short test is carried out by using the first or second short means, the overcurrent cut-off means cuts off an overcurrent flow generated by short-circuit of the first or second short transformer to stop the operation of the switching element. Therefore, even if a protection circuit such as a conventional temperature fuse is not provided, an operation of the switching element can be stopped in a short time, which can contribute to compactness of the electrical device and reduction in production costs.

In a preferred embodiment of the invention, each of the first and second short means is formed of switch, the switch is set to be open in advance and then is closed at a time of carrying out the short test.

According to this embodiment, a transformer can be short-circuited by a simple structure utilizing a switch.

In a preferred embodiment of the invention, the overcurrent cut-off means is formed of fuse.

According to this embodiment, an overcurrent flow can be cut off by a simple structure utilizing a fuse.

In order to accomplish the aforementioned object, the present invention provides a DC—DC converter that converts a direct voltage inputted from a direct power source into another direct voltage and outputs a converted voltage, the DC—DC converter comprising primary windings of two or more transformers connected in series to the direct power source and connected in series with each other; a switching element connected in series to the primary windings of the two or more transformers; secondary windings of the two or more transformers connected in parallel with each other; a first rectifying and smoothing circuit for rectifying and smoothing a voltage which is induced by the secondary windings of the two or more transformers; auxiliary windings of the two or more transformers coupled magnetically to the primary windings of the two or more transformers and connected in parallel with each other; a second rectifying and smoothing circuit for rectifying and smoothing a voltage which is induced by the auxiliary windings of the two or more transformers; an overvoltage detection circuit that outputs a stop signal if a voltage outputted from the second rectifying and smoothing circuit is larger than a reference voltage; a control circuit that stops an operation of the switching element in response to the stop signal outputted from the overvoltage detection circuit; a first open means for open-circuiting a transformer, that is connected in series to a primary winding of first open transformer selected among the two or more transformers; and a second open means for open-circuiting a transformer, that is connected in series to a secondary winding of second open transformer selected among the two or more transformers, wherein when carried out by using the first or second open means is an open test for confirming safety of device, an operation of the switching element is stopped.

According to the present invention, when the open test is carried out by using the first or second open means, the operation of the switching element can be stopped in a short time. Therefore, the electrical device can be safely protected from damages.

In a preferred embodiment of the invention, each of the first and second open means is formed of switch, the switch is set to be closed in advance and then is opened at a time of carrying out the open test.

According to this embodiment, a transformer can be open-circuited by a simple structure utilizing a switch.

In a preferred embodiment of the invention, when the open test is carried out by using the first open means, the first open means cuts off a flow of current so as to stop an operation of the switching element, and when the open test is carried out by using the second open means, the stop signal is outputted from the control circuit in response to a surge voltage, which is generated on the auxiliary winding due to open of the second open transformer, so as to stop an operation of the switching element.

According to the present embodiment, when the open test is carried out by using the first open means, the first open means cuts off a flow of current to stop the operation of the switching element. When the open test is carried out by using the second open means, a stop signal is outputted from the control circuit in response to a surge voltage, which is generated on the auxiliary winding due to open-circuit of the second open transformer, to stop the operation of the switching element. Therefore, even if a protection circuit such as a conventional temperature fuse is not provided, the operation of the switching element can be stopped in a short time, which can contribute to compactness of the electrical device and reduction in production costs.

In order to accomplish the aforementioned object, the present invention provides a DC—DC converter that converts a direct voltage inputted from a direct power source into another direct voltage and outputs a converted voltage, the DC—DC converter comprising an overcurrent cut-off means for cutting off an overcurrent flow, that is connected in series to the direct power source; primary windings of two or more transformers connected in series to the overcurrent cut-off means and connected in series with each other; a switching element connected in series to the primary windings of the two or more transformers; secondary windings of the two or more transformers connected in parallel with each other; a first rectifying and smoothing circuit for rectifying and smoothing a voltage which is induced by the secondary windings of the two or more transformers; a voltage detection circuit outputting a feedback signal in response to error voltage between a first reference voltage and the smooth direct voltage outputted from the first rectifying and smoothing circuit; auxiliary windings of the two or more transformers coupled magnetically to the primary windings of the two or more transformers and connected in parallel with each other; a second rectifying and smoothing circuit for rectifying and smoothing a voltage induced by the auxiliary windings of the two or more transformers; an overvoltage detection circuit that outputs a stop signal if a voltage outputted from the second rectifying and smoothing circuit is larger than a second reference voltage; a control circuit that controls an on period of the switching element in response to the feedback signal outputted from the voltage detection circuit and stops the operation of the switching element according to the stop signal outputted from the overvoltage detection circuit; a first short means for short-circuiting a transformer, that is connected in parallel to a primary winding of first short transformer selected among the two or more transformers; a second short means for short-circuiting a transformer, that is connected in parallel to a secondary winding of second short transformer selected among the two or more transformers; a first open means for open-circuiting a transformer, that is connected in series to a primary winding of first open transformer selected among the two or more transformers; and a second open means for open-circuiting a transformer, that is connected in series to a secondary winding of second open transformer selected among the two or more transformers, wherein when carried out by using the first or second short means is a short test for confirming safety of device or carried out by using the first or second open means is an opne test for confirming safety of device, the operation of the switching element is stopped.

According to the present invention, when the short test is carried out by using the first or second short means or the open test is carried out by using the first or second open means, the operation of the switching element can be stopped in a short time. Therefore, the electrical device can be safely protected from damages.

In a preferred embodiment of the invention, each of the first and second short means is formed of switch, the switch is set to be open in advance and then is closed at a time of carrying out the short test, each of the first and second open means is formed of switch, the switch is set to be closed in advance and then is opened at a time of carrying out the open test, and the overcurrent cut-off means is formed of fuse.

According to this embodiment, a transformer can be short-circuited or open-circuited by a simple structure utilizing a switch. Further, an overcurrent flow can be cut off by a simple structure utilizing a fuse.

In a preferred embodiment of the invention, when the short test is carried out by using the first or second short means, the overcurrent cut-off means cuts off an overcurrent flow, which is generated by short of the first or second short transformer, so as to stop the operation of the switching element, when the open test is carried out by using the first open means, the first open means cuts off a flow of current so as to stop the operation of the switching element, and when the open test is carried out by using the second open means, the stop signal is outputted from the control circuit in response to a surge voltage, which is generated on the auxiliary winding due to open of the second open transformer, so as to stop the operation of the switching element.

According to this embodiment, when the short test is carried out by using the first or second short means, the overcurrent cut-off means cuts off an overcurrent flow, which is generated by short-circuit of the first or second short transformer, to stop the operation of the switching element. Further, when the open test is carried out upon this DC—DC converter by using the first open means, the first open means cuts off a flow of current to stop the operation of the switching element. When the open test is carried out by using the second open means, a stop signal is outputted from the control circuit in response to a surge voltage, which is generated at the auxiliary winding due to open of the second open transformer, to stop the operation of the switching element. Therefore, even if a protection circuit such as a conventional temperature fuse is not provided, the operation of the switching element can be stopped, which can contribute to compactness of the electrical device and reduction in production costs.

DESCRIPTION OF THE PREFERRED EMBODIMENTS

Figure 1:
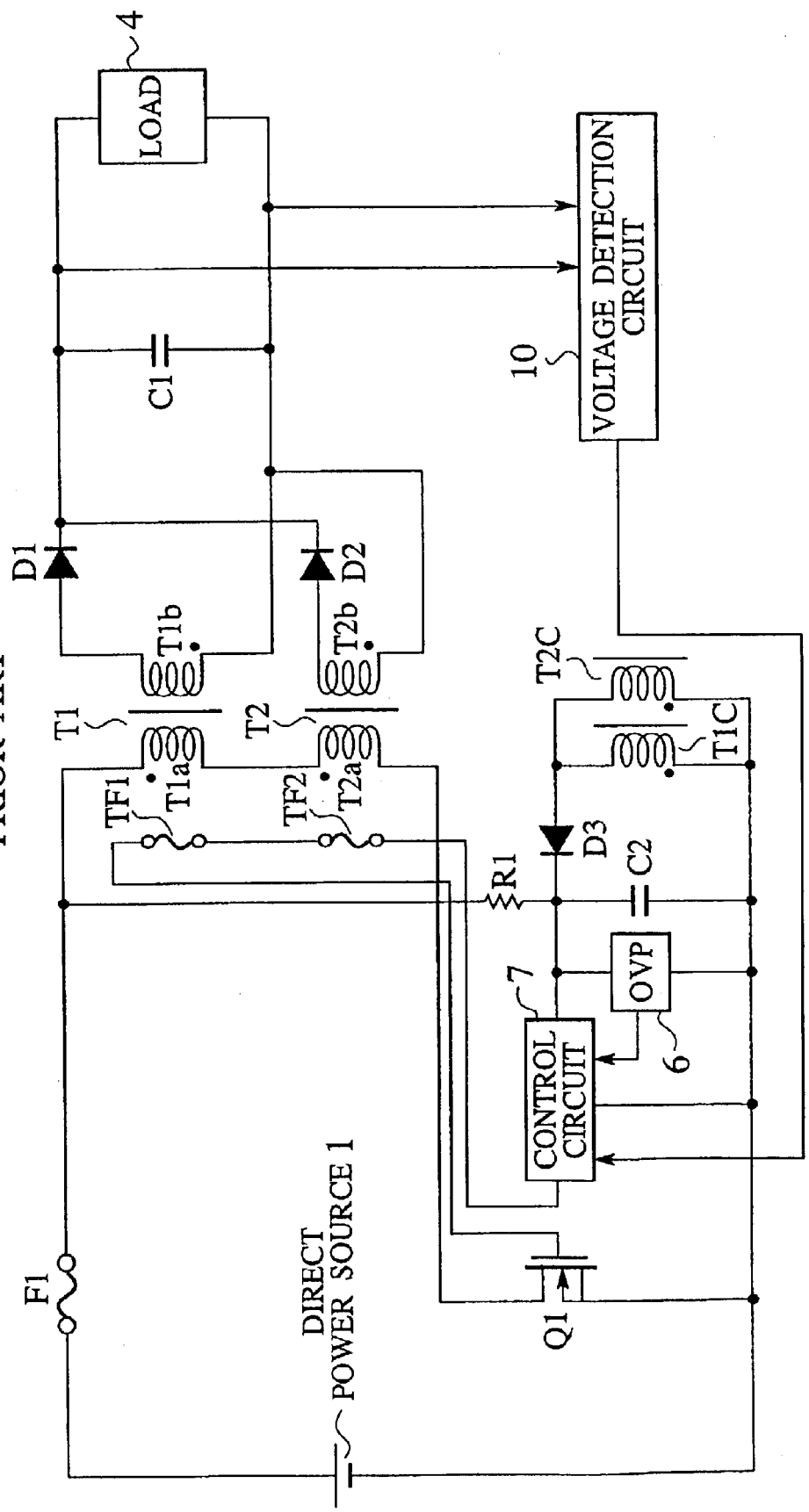
FIG. 1 is a circuit diagram illustrating a structure of conventional DC—DC converter.
Figure 3:
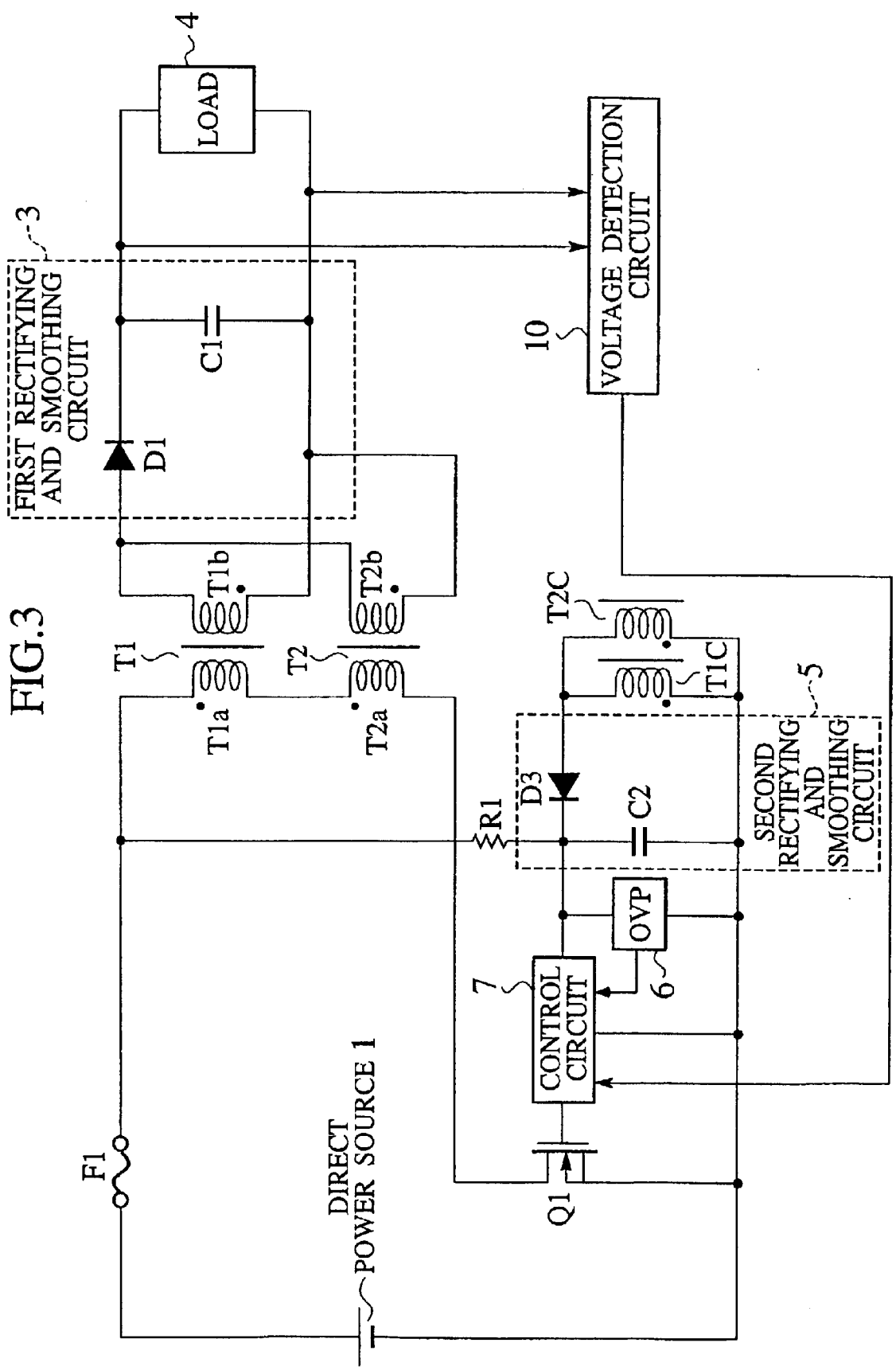
FIG. 3 is a circuit diagram illustrating a structure of DC—DC converter relating to an embodiment of the present invention.

Embodiments of the present invention will be described hereinafter with reference to the drawings. FIG. 3 is a circuit diagram showing a structure of DC—DC converter relating to an embodiment of the present invention. Portions of the DC—DC converter shown in FIG. 3 which are the same as or similar to those of conventional DC—DC converter shown in FIG. 1 is denoted by the same reference numerals.

A fuse F1 for cutting off an overcurrent flow (overcurrent cut-off means) is connected in series to a direct power source 1. The fuse F1 is connected in series to a primary winding T1a of transformer T1 and a primary winding T2a of transformer T2 in that order. One end of the primary winding T2a is connected to a drain of switching element Q1. A source of the switching element Q1 is connected to the direct power source 1. A secondary winding T1b of the transformer T1 and a secondary winding T2b of the transformer T2 are connected in parallel with each other. One ends of the secondary windings T1b and T2b are commonly connected to an anode of diode D1 of first rectifying and smoothing circuit 3. The first rectifying and smoothing circuit 3 is provided with the diode D1 and a capacitor C1. At this circuit, a voltage induced on the secondary windings T1b and T2b is rectified and smoothed, and then is outputted to a load 4 as an output voltage.

A voltage detection circuit 10 is connected to both terminals of the capacitor C1 provided in the first rectifying and smoothing circuit 3. The voltage detection circuit 10 detects an error voltage between a voltage of the capacitor C1 and a reference voltage Vref, and outputs a feedback signal to a control circuit 7. The transformer T1 is also provided with an auxiliary winding T1c coupled magnetically to the primary winding T1a. Similarly, the transformer T2 is provided with an auxiliary winding T2c coupled magnetically to the primary winding T2a. As shown in FIG. 3, the auxiliary windings T1c and T2c are connected with each other in parallel. One ends of the auxiliary windings are commonly connected to an anode of diode D3 of second rectifying and smoothing circuit 5.

The second rectifying and smoothing circuit 5 is provided with the diode D3 and a capacitor C2. At this circuit, a voltage induced by the auxiliary windings T1c and T2c is rectified and smoothed, and then outputted to an OVP (overvoltage detection circuit) 6 and the control circuit 7. One end of the capacitor C2 provided in the second rectifying and smoothing circuit 5 is connected via a starting resistance R1 and the fuse F1 to the direct power source 1. In such structure, when a direct voltage is applied from the direct power source 1, a current starts to flow from the direct power source 1 through the fuse 1 and the starting resistance R1 to the capacitor C2. Then, according to a voltage of the capacitor C2 being increased, the control circuit 7 is activated.

The OVP 6 has a Zener diode for generating a reference voltage. If a voltage induced on the second rectifying and smoothing circuit 5 is larger than a reference voltage of the Zener diode, it means that an overvoltage is generated within the DC—DC converter. Then, in order to eliminate such overvoltage, a stop signal is outputted to the control circuit 7. As well as controlling an on period of the switching element Q1 depending on a feedback signal outputted from the voltage detection circuit 10, the control circuit 7 stops generation of PWM signal depending on the stop signal outputted from the OVP 6 and outputs a low level signal to the gate of the switching element Q1. In this way, an operation of the switching element Q1 is stopped. Although the present embodiment is structured by using the transformers T1 and T2 for convenience of explanation, three or more transformers may be used.

Next, an operation of the DC—DC converter relating to one embodiment of the present invention in a normal state will be described with reference to FIG. 3. When a direct voltage is applied from the direct power source 1, a current starts to flow from the direct power source 1 through the fuse F1 and the starting resistance R1 to the capacitor C2 to increase a voltage of the capacitor C2 gradually. This activates the control circuit 7 to output a PWM signal to the gate of the switching element Q1.

As a result, the switching element Q1 is on-off controlled and energy is sequentially induced from the primary windings T1a and T2a to the secondary windings T1b and T2b. Then, energy induced by the secondary windings T1b and T2b is rectified and smoothed by the diode D1 and the capacitor C1, and then is supplied to the load 4 as an output voltage. Further, by the voltage detection circuit 10, an output voltage generated at ends of the capacitor C1 is detected, and a feedback signal showing error voltage between the detected voltage and a reference voltage Vref, is outputted to the control circuit 7. The control circuit 7 controls an on period of the switching element Q1 on the basis of the feedback signal so that a certain output voltage is supplied to the load 4.

Figure 2:
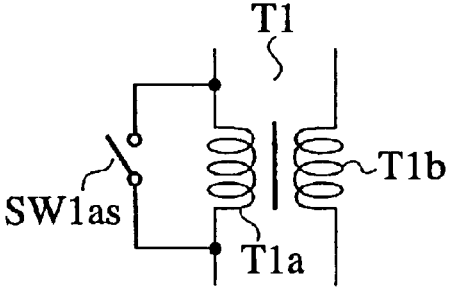
FIG. 2 is a table showing items and contents of abnormal test carried out upon a DC—DC converter, in which a transformer is shorted or opened.
Figure 2:
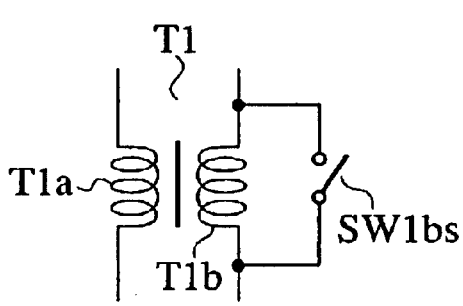
Figure 2:
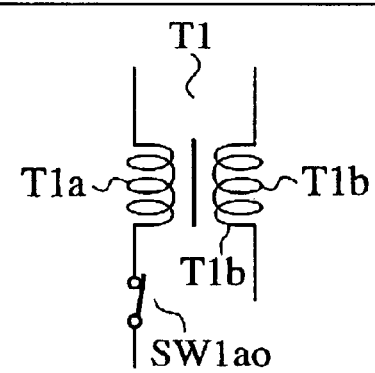
Figure 2:
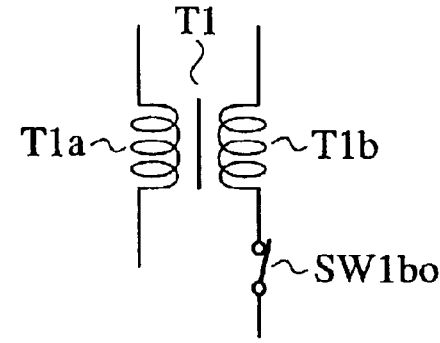

Next, a description will be given of an operation of the DC—DC converter relating to an embodiment of the present invention at a time of carrying out an abnormal test for confirming safety of device by short-circuiting or open-circuiting a transformer thereof. As shown in FIG. 2, the abnormal test is formed of four kinds of items.

(1) Short of Primary Winding

As shown in FIG. 2(1), a switch SW1as is open in advance and is connected in parallel to the primary winding T1a of the transformer T1. When the switch SW1as is closed during an operation of the DC—DC converter, an inductance component L of the secondary winding T1b is minimized. At the same time, since the secondary winding T1b is directly connected in parallel to the secondary winding T2b, an inductance component L of the second winding T2b is also minimized.

Further, if the inductance component L of the secondary winding T2b is minimized, an inductance component L of the primary winding T2a is also minimized. Since the inductance components of the primary windings T1a and T2a are minimized, an overcurrent flows from the direct power source 1 via the fuse F1, the switch SW1as and the primary winding T2a to a drain-source of the switching element Q1. By this overcurrent or larger overcurrent due to damage of the switching element Q1, the fuse F1 is fused in short time to cut off current flow in the circuit. This stops operations of the switching element Q1 and the DC—DC converter. The above-described operations can prevent the DC—DC converter from firing or smoking caused by overheating of itself. As a result, the electrical device is safely protected from damages.

As described above, this short test is carried out for the primary winding of transformer in the DC—DC converter including an overcurrent cut-off means connected in series to a direct power source, primary windings of a plurality of transformers connected in series to the overcurrent cut-off means, a switching element connected in series to the overcurrent cut-off means and secondary windings of a plurality of transformers connected together in parallel, wherein a voltage induced by the secondary windings is rectified and smoothed by a rectifying and smoothing circuit and then a resultant direct voltage is outputted to a load. When this short test is carried out for the primary winding, overcurrent flows through the circuit. However, in short time, the fuse cuts off this flow to stop operations of the switching element and the DC—DC converter. Therefore, even if a protection circuit such as a temperature fuse is not provided, the electrical device can be safely protected from damages.

(2) Short of Secondary Winding

As shown in FIG. 2(2), a switch SW1bs is open in advance and is connected in parallel to the secondary winding T1b of the transformer T1. When the switch SW1bs is closed during an operation of the DC—DC converter, inductance components L of the secondary windings T1b and T2b of the transformers T1 and T2 are minimized because the second windings T1b and T2b are connected with each other in parallel. At the same time, inductance components L of the primary windings T1a and T2a of the transformers T1 and T2 are also minimized.

Since the inductance components of the primary windings T1a and T2a are minimized, an overcurrent flows from the direct power source 1 via the fuse F1 and the primary windings T1a and T2a to the drain-source of the switching element Q1. By this overcurrent or larger overcurrent due to damage of the switching element Q1, the fuse F1 is fused in short time to cut off current flow in the circuit. This stops operations of the switching element Q1 and the DC—DC converter. The above-described operations can prevent the DC—DC converter from firing or smoking caused by overheating of itself. As a result, the electrical device is safely protected from damages.

As described above, this short test is carried out for the secondary winding of transformer in the DC—DC converter including an overcurrent cut-off means connected in series to a direct power source, primary windings of a plurality of transformers connected in series to the overcurrent cut-off means, a switching element connected in series to the overcurrent cut-off means and secondary windings of a plurality of transformers connected together in parallel, wherein a voltage induced by the secondary windings is rectified and smoothed by a rectifying and smoothing circuit and then a resultant direct voltage is outputted to a load. When this short test is carried out for the secondary winding, overcurrent flows through the circuit. However, in short time, the fuse cuts off this flow to stop operations of the switching element and the DC—DC converter. Therefore, even if a protection circuit such as a temperature fuse is not provided, the electrical device can be safely protected from damages.

(3) Open of Primary Winding

As shown in FIG. 2(3), a switch SW1ao is closed in advance and is connected in series to the primary winding T1a of the transformer T1. When the switch SW1ao is opened during an operation of the DC—DC converter, a current loop flowing through, in that order, the direct power source 1, the fuse F1, the primary winding T1a of the transformer T1, the primary winding T2a of the transformer T2, the drain of the switching element Q1 and the source of the switching element Q1 is cut off. This stops an operation of the switching element Q1. Accordingly, when the open test is performed upon the primary winding of transformer, operations of the switching element and the DC—DC converter are stopped in a short time. As a result, the electrical device can be safely protected from damages.

(4) Open of Secondary Winding

As shown in FIG. 2(4), a switch SW1bo is closed in advance and is connected in series to the secondary winding T1b of the transformer T1. When the switch SW1bo is opened during an operation of the DC—DC converter, excess surge voltage is generated at the primary winding T1a of the transformer T1. The surge voltage is also generated at the auxiliary winding T1c coupled magnetically to the primary winding T1a. When the surge voltage is induced by the auxiliary winding T1c, an overvoltage is generated on the auxiliary winding T1c to charge the capacitor C2 via the diode D3. Then, if a voltage of the capacitor C2 becomes higher than a reference voltage Vref of the OVP6, the OVP 6 outputs a stop signal to the control circuit 7. The control circuit 7 stops generation of PWM signal on the basis of the stop signal outputted from the OVP 6 and outputs a low level signal to the switching element Q1. As a result, the operation of the switching element Q1 is stopped.

As described above, the open test is carried out for secondary winding of transformer in a DC—DC converter including primary windings of a plurality of transformers connected in series to a direct power source, a switching element connected in series to the direct power source, secondary windings of a plurality of transformers connected in parallel with each other and auxiliary windings coupled magnetically to the primary windings, wherein a voltage induced by the secondary windings is rectified and smoothed by a rectifying and smoothing circuit to output a direct voltage to a load, further a voltage induced by the auxiliary winding is rectified and smoothed by a second rectifying and smoothing circuit to output a direct voltage to the OVP 6 and the control circuit 7. In the DC—DC converter, if the voltage induced by the second rectifying and smoothing circuit is larger than a reference voltage Vref of the OVP 6, a stop signal is transmitted from the OVP 6 to the control circuit 7 to stop the operation of the switching element Q1. Accordingly, when the open test is carried out for the second winding of transformer, even if a protection circuit such as a temperature fuse is not provided, an operation of the switching element can be stopped in a short time by the stop signal outputted from the OVP6 without the electrical device being damaged.

Although the above-described abnormal test items (1) through (4) are carried out for the transformer T1, the same test items may be carried out for the transformer T2 and the same results can be obtained.

MODIFIED EXAMPLE

Figure 4:
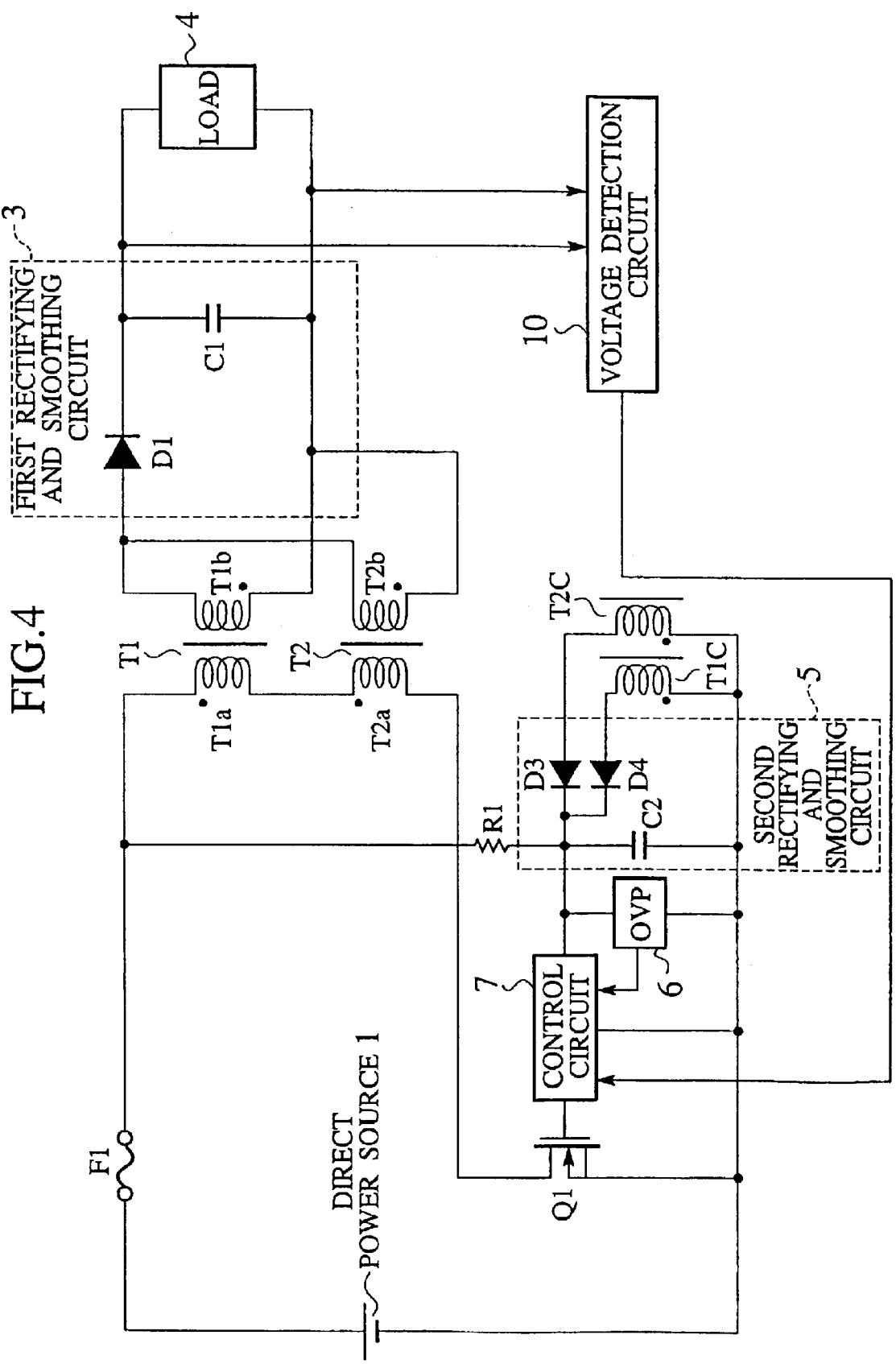
FIG. 4 is a circuit diagram showing a structure of modified example of the DC—DC converter relating to the embodiment of the present invention.

FIG. 4 is a circuit diagram showing a structure of modified example of DC—DC converter relating to an embodiment of the present invention. According to characteristics of this modified example, as shown in FIG. 4, one end of auxiliary winding T1c is connected in series to an anode of diode D4 of second rectifying and smoothing circuit 5. One end of auxiliary winding T2c is connected in series to an anode of diode D3 of the second rectifying and smoothing circuit 5. Further, cathodes of the diodes D3 and D4 are commonly connected to a positive electrode of the capacitor C2.

If a voltage outputted from the second rectifying and smoothing circuit 5 is larger than a reference voltage Vref of the OVP 6, a stop signal is transmitted from the OVP 6 to the control circuit 7. Then, the control circuit 7 controls the switching element Q1 on the basis of the stop signal in order to stop an operation of the switching element Q1. Consequently, when the open test is carried out for the secondary winding of transformer, an operation of the switching element can be stopped in short time and the electrical device can be safely protected from damages.

In the conventional DC—DC converter, since the secondary windings are not directly connected in parallel with each other, more particularly, are respectively connected in series to anodes of diodes, the inductance component of one winding is independent on that of another winding. In the DC—DC converter relating to these embodiments, however, since the secondary windings are directly connected in parallel with each other, the inductance component of one winding is dependent on that of another winding. Therefore, at the time of generating an abnormal condition of DC—DC converter, overcurrent flow or excess surge voltage generates on simple circuit structures of these embodiments in short time.

As described above, when the abnormal test for confirming safety of device by short-circuiting or open-circuiting a transformer is carried out for primary or secondary windings, operations of switching element and DC—DC converter can be stopped in a short time even if a protection circuit such as a temperature fuse is not provided, which can contribute to compactness of the electrical device and reduction in production costs.

What is claimed is:

1. A DC—DC converter that converts a direct voltage inputted from a direct power source into a predetermined direct voltage by controlling an on period of switching element and outputs a converted voltage, comprising:

an overcurrent cut-off means connected in series to the direct power source;

primary windings of two or more transformers connected in series to the overcurrent cut-off means;

secondary windings of the two or more transformers connected in parallel with each other; and auxiliary windings of the two or more transformers connected in parallel with each other.

2. A DC—DC converter that converts a direct voltage inputted from a direct power source into another direct voltage and outputs a converted voltage, comprising:

an overcurrent cut-off means connected in series to the direct power source and cutting off an overcurrent flow;

primary windings of two or more transformers connected in series to the overcurrent cut-off means and connected in series with each other;

a switching element connected in series to the primary windings of the two or more transformers;

secondary windings of the two or more transformers connected in parallel with each other;

a rectifying and smoothing circuit for rectifying and smoothing a voltage which is induced by the secondary windings of the two or more transformers;

a first short means for short-circuiting a transformer, that is connected in parallel to a primary winding of first short transformer selected among the two or more transformers; and a second short means for short-circuiting a transformer, that is connected in parallel to a secondary winding of second short transformer selected among the two or more transformers, wherein when carried out by using the first or second short means is a short test for confirming safety of device, the overcurrent cut-off means cuts off an overcurrent flow generated by short-circuit of the first or second short transformer.

3. The DC—DC converter according to claim 2, wherein each of the first and second short means is formed of switch, the switch is set to be open in advance and then is closed at a time of carrying out the short test.

4. The DC—DC converter according to claim 2, wherein the overcurrent cut-off means is formed of fuse.

5. A DC—DC converter that converts a direct voltage inputted from a direct power source into another direct voltage and outputs a converted voltage, comprising:

primary windings of two or more transformers connected in series to the direct power source and connected in series with each other;

a switching element connected in series to the primary windings of the two or more transformers;

secondary windings of the two or more transformers connected in parallel with each other;

a first rectifying and smoothing circuit for rectifying and smoothing a voltage which is induced by the secondary windings of the two or more transformers;

auxiliary windings of the two or more transformers coupled magnetically to the primary windings of the two or more transformers and connected in parallel with each other;

a second rectifying and smoothing circuit for rectifying and smoothing a voltage which is induced by the auxiliary windings of the two or more transformers;

an overvoltage detection circuit that outputs a stop signal if a voltage outputted from the second rectifying and smoothing circuit is larger than a second reference voltage;

a control circuit that stops an operation of the switching element in response to the stop signal outputted from the overvoltage detection circuit;

a first open means for open-circuiting a transformer, that is connected in series to a primary winding of first open transformer selected among the two or more transformers; and a second open means for open-circuiting a transformer, that is connected in series to a secondary winding of second open transformer selected among the two or more transformers, wherein when carried out by using the first or second open means is an open test for confirming safety of device, an operation of the switching element is stopped.

6. The DC—DC converter according to claim 5, wherein each of the first and second open means is formed of switch, the switch is set to be closed in advance and then is opened at a time of carrying out the open test.

7. The DC—DC converter according to claim 5, wherein when the open test is carried out by using the first open means, the first open means cuts off a flow of current so as to stop an operation of the switching element, and when the open test is carried out by using the second open means, the stop signal is outputted from the control circuit in response to a surge voltage, which is generated on the auxiliary winding due to open of the second open transformer, so as to stop an operation of the switching element.

8. A DC—DC converter that converts a direct voltage inputted from a direct power source into another direct voltage and outputs a converted voltage, comprising:

an overcurrent cut-off means for cutting off an overcurrent flow, that is connected in series to the direct power source;

primary windings of two or more transformers connected in series to the overcurrent cut-off means and connected in series with each other;

a switching element connected in series to the primary windings of the two or more transformers;

secondary windings of the two or more transformers connected in parallel with each other;

a first rectifying and smoothing circuit for rectifying and smoothing a voltage which is induced by the secondary windings of the two or more transformers;

a voltage detection circuit outputting a feedback signal in response to error voltage between a first reference voltage and the smooth direct voltage outputted from the first rectifying and smoothing circuit;

auxiliary windings of the two or more transformers coupled magnetically to the primary windings of the two or more transformers and connected in parallel with each other;

a second rectifying and smoothing circuit for rectifying and smoothing a voltage induced by the auxiliary windings of the two or more transformers;

an overvoltage detection circuit that outputs a stop signal if a voltage outputted from the second rectifying and smoothing circuit is larger than a second reference voltage;

a control circuit that controls an on period of the switching element in response to the feedback signal outputted from the voltage detection circuit and stops the operation of the switching element according to the stop signal outputted from the overvoltage detection circuit;

a first short means for short-circuiting a transformer, that is connected in parallel to a primary winding of first short transformer selected among the two or more transformers;

a second short means for short-circuiting a transformer, that is connected in parallel to a secondary winding of second short transformer selected among the two or more transformers;

a first open means for open-circuiting a transformer, that is connected in series to a primary winding of first open transformer selected among the two or more transformers; and a second open means for open-circuiting a transformer, that is connected in series to a secondary winding of second open transformer selected among the two or more transformers, wherein when carried out by using the first or second short means is a short test for confirming safety of device or carried out by using the first or second open means is an open test for confirming safety of device, the operation of the switching element is stopped.

9. The DC—DC converter according to claim 8, wherein each of the first and second short means is formed of switch, the switch is set to be open in advance and then is closed at a time of carrying out the short test, each of the first and second open means is formed of switch, the switch is set to be closed in advance and then is opened at a time of carrying out the open test, and the overcurrent cut-off means is formed of fuse.

10. The DC—DC converter according to claim 8, wherein when the short test is carried out by using the first or second short means, the overcurrent cut-off means cuts off an overcurrent flow, which is generated by short of the first or second short transformer, so as to stop the operation of the switching element, when the open test is carried out by using the first open means, the first open means cuts off a flow of current so as to stop the operation of the switching element, and when the open test is carried out by using the second open means, the stop signal is outputted from the control circuit in response to a surge voltage, which is generated on the auxiliary winding due to open of the second open transformer, so as to stop the operation of the switching element.

* * * * *